WRIGHT & BROWN.
Blast Furnace.
No. 15,541.  Patented Aug. 12, 1856.
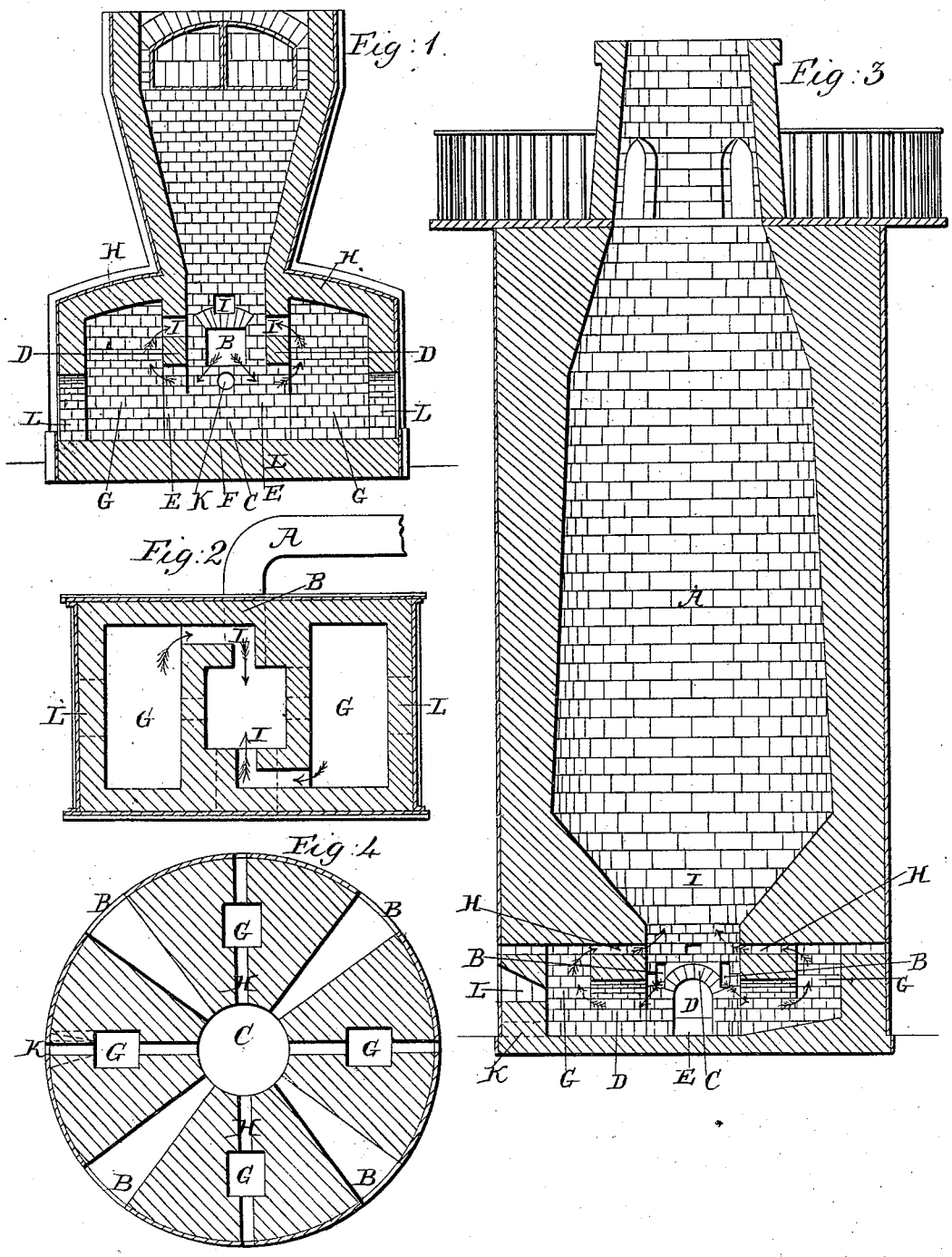

UNITED STATES PATENT OFFICE.

WILLIAM WRIGHT AND GEORGE BROWN, OF NEWCASTLE-UPON-TYNE, ENGLAND.

IMPROVEMENT IN BLAST-FURNACES.

Specification forming part of Letters Patent No. 15,541, dated August 12, 1856.

*To all whom it may concern:*

Be it known that we, WILLIAM WRIGHT and GEORGE BROWN, trading under the firm of WRIGHT & BROWN, of the town and county of Newcastle-upon-Tyne, iron-founders, have invented certain Improvements in Cupolas, which improvements are also applicable to smelting and other furnaces; and we do hereby declare that the following is a full, clear, and exact description of the principle or character which distinguishes them from all other things before known, and of the usual manner of making, modifying, and using the same, reference being had to the drawings hereunto annexed, and to the letters and figures marked thereon—that is to say:

Our said invention relates to various arrangements and constructions of cupolas, blast-furnaces, and apparatus for melting or smelting metals and metallic ores, whereby superior economy in the manufacturing cost and rapidity of production are secured. According to this invention, instead of blowing the air into the melting contents of the cupola or furnace either in a cold state or primarily heated by passing through a separate heating apparatus, the cupola or furnace is so formed that it may act as the heater for its own blast. Under such modification the lower portion of the cupola or furnace is formed with receiving-chambers so contrived that they may hold a mass of melted metal as descended from the body of the cupola or furnace, and thus act as the heating-surface for the cold-air supply. Thus the external cold air is first blown into these chambers, and, being there heated, it passes off into actual contact with the melting mass of material under treatment. As applied in the construction of smelting or blast furnaces, the cold air is first blown into the lower part of the body of the furnace, and it is then passed into heating-chambers formed in the bottom and sides of the furnace-body, and it is then conveyed into the furnace at a level slightly above that of the blast-hole, and made to pass through the coke and metal with which the furnace is charged.

In order that our said invention may be properly understood, we shall now proceed to describe the several figures on the sheet of drawings hereunto attached.

Figure 1 on our sheet of drawings is a vertical longitudinal section of a cupola as constructed with the view of carrying out our improvements. Fig. 2 is a sectional plan of the same corresponding. Fig. 3 is a vertical longitudinal section of a smelting-furnace as built for smelting iron, with heating-charmbers according to our invention. Fig. 4 is a sectional plan of the same.

In Figs. 1 and 2 the air enters from the blowing-engine or blast-fan by the pipe A, passing thence through the cupola-wall at B into the central portion, C, of the bottom of the cupola. This primary air-receiving portion of the cupola being thus filled with air under pressure, which air is restrained from passing upward by the presence of the mass of contained materials above, a partially-descending current necessarily arises. Hence the air diverges downward and passes out of the part C through the vertical division-walls D by the archways E, which are open to the base-line F of the cupola-bottom. The air thus reaches and enters the bottom expanded chambers G, which, together with the central portion of the cupola-base, have their bottoms covered to a greater or less extent with melted metal. The arrows indicate the course of the air, showing how it circulates to the extreme end of the chambers G and returns along the arched tops H of these chambers. The air is by this means treated to a very high temperature, and in this condition it passes onward and re-enters the main body of the cupola by passing through the walls D by the lateral ports I. Here it permeates the melting mass of metal and coke, through which it finds its way in the usual manner. The upper portion, J, of the cupola may be built to any desired form, and as the melted metal comes down it gradually accumulates in the bottom, and is tapped or withdrawn as required through the archway-doors K. The heating-chambers may be filled up more or less with sand when small castings are to be made. The slag-hole is at L.

In the smelting-furnace, Figs. 3 and 4, the external contour is not at all interfered with, the main body A being a pure cylinder all the way down. The air from the blast-engine is supplied by the four pipes B, which enter the furnace-body at regular distance asunder.

This quadruple current thus keeps up a constantly-uniform air-pressure in the central space, C, beneath the mass of melting materials. This compressed-air supply can only escape through the four lateral archways D, alternated with the four entrance-thoroughfares. In this way the air is made to pass in contact with the surface of the melted mass of material on the bottom E of the furnace, as well as with that contained in the archway-passages D and their external corresponding chambers, G. This heated air then rises up through the chambers G and returns toward the body of the furnace through the converging thoroughfares H, and penetrates the melting mass of metal and materials at I by issuing through the ports J. The tapping takes place through the outlet K, while the bottom of the furnace can be cleared out through the slag-aperture L. It will be obvious to the practical man that this system of self-heating furnaces may be carried out with various forms of chambers and apparatus, and that it is applicable to all forms of melting or reducing furnaces.

Having now described and particularly ascertained the nature of our said invention and the manner in which the same is or may be used or carried into effect, we would observe, in conclusion, that we do not confine or restrict ourselves to the precise details or arrangements which we have had occasion to describe or refer to, as many variations may be made therefrom without deviating from the principles or main features of our said invention; but

What we consider to be novel and original, and therefore claim as the invention to be secured to us by Letters Patent of the United States, is—

1. The general arrangement and construction of cupolas and smelting-furnaces for the self-heating of the air-blast by the arrangement of the chambers and air-passages, as hereinbefore described.

2. The system or mode of heating the air-blast of cupolas and furnaces by passing the air over the surface of or in contact with the melted or heated mass of material as brought down from the cupola or furnace body.

In witness whereof we, the said WILLIAM WRIGHT and GEORGE BROWN, have hereunto set our hands and seals this 15th day of June, A. D. 1854.

WILLIAM WRIGHT. [L. S.]
GEORGE BROWN. [L. S.]

In the presence of—
J. HENRY JOHNSON,
49 *Lincoln's Inn Fields, Solicitor and Patent Agent.*
B. HUNT,
*His Clerk.*